US009635137B2

United States Patent
Brobst et al.

(10) Patent No.: US 9,635,137 B2
(45) Date of Patent: *Apr. 25, 2017

(54) GEOSPATIAL VISUALIZATION PERFORMANCE IMPROVEMENT FOR CONTIGUOUS POLYLINES WITH SIMILAR DYNAMIC CHARACTERISTICS

(71) Applicant: International Business Machines Corporation, Armonk, NY (US)

(72) Inventors: Curtis H. Brobst, Elgin, MN (US); James P. Cantwell, Dublin (IE); Magda M. Mourad, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/189,583

(22) Filed: Feb. 25, 2014

(65) Prior Publication Data

US 2014/0181189 A1   Jun. 26, 2014

Related U.S. Application Data

(63) Continuation of application No. 13/164,504, filed on Jun. 20, 2011, now Pat. No. 8,694,603.

(51) Int. Cl.
*H04L 29/06* (2006.01)
*G01C 21/32* (2006.01)
(Continued)

(52) U.S. Cl.
CPC ............. *H04L 67/42* (2013.01); *G01C 21/32* (2013.01); *G01C 21/3694* (2013.01);
(Continued)

(58) Field of Classification Search
CPC .... G08G 1/168; G01C 21/32; G01C 21/3694; H04L 67/42; G09B 29/003; G09B 29/007; G06T 17/05
See application file for complete search history.

(56) References Cited

U.S. PATENT DOCUMENTS

| 6,118,404 A * | 9/2000 | Fernekes ................ G01C 21/32 340/990 |
| 6,839,632 B2 | 1/2005 | Grace |

(Continued)

FOREIGN PATENT DOCUMENTS

JP  11328371 A  11/1999

OTHER PUBLICATIONS

Hang Yu, "Automatic map simplification for visualization on mobile devices," World Academy of Science, Engineering and Technology, Jun. 2010, vol. 66(118): pp. 722-729.

(Continued)

*Primary Examiner* — Abdullahi E Salad
(74) *Attorney, Agent, or Firm* — Patterson + Sheridan, LLP (57) ABSTRACT

Techniques are disclosed for rendering geographic information system (GIS) data. A server component responding to a request for GIS data for a given area combines contiguous elements that share the same dynamic characteristics. For example, a map server may combine the polylines of contiguous road segments sharing the same current speed/congestion conditions. Doing so may greatly reduce the number of individual polylines that are sent to a client for rendering.

24 Claims, 7 Drawing Sheets

(51) Int. Cl.
  *G01C 21/36* (2006.01)
  *G06T 17/05* (2011.01)
  *G09B 29/00* (2006.01)
  *G08G 1/16* (2006.01)

(52) U.S. Cl.
  CPC ............. *G06T 17/05* (2013.01); *G08G 1/168* (2013.01); *G09B 29/003* (2013.01); *G09B 29/007* (2013.01)

(56) References Cited

U.S. PATENT DOCUMENTS

| | | | |
|---|---|---|---|
| 7,096,117 | B1 | 8/2006 | Gale et al. |
| 7,440,875 | B2 | 10/2008 | Cuthbert et al. |
| 7,702,652 | B2 | 4/2010 | Twig et al. |
| 2002/0067379 | A1 | 6/2002 | Kenyon et al. |
| 2003/0231190 | A1 | 12/2003 | Jawerth et al. |
| 2004/0049345 | A1 | 3/2004 | McDonough et al. |
| 2004/0176974 | A1* | 9/2004 | Twig ................... G06Q 10/025 715/712 |
| 2006/0004515 | A1 | 1/2006 | McDonough |
| 2007/0139411 | A1* | 6/2007 | Jawerth ..................... G06T 9/00 345/440 |
| 2009/0142002 | A1 | 6/2009 | Middendorf |
| 2009/0183083 | A1* | 7/2009 | Hedges ............... G06F 3/04817 715/738 |
| 2010/0082307 | A1 | 4/2010 | Dorum et al. |
| 2010/0223551 | A1 | 9/2010 | Twig et al. |
| 2010/0225642 | A1 | 9/2010 | Murray et al. |
| 2011/0112760 | A1* | 5/2011 | Serbanescu ............ G01C 21/32 701/465 |
| 2011/0282578 | A1 | 11/2011 | Miksa et al. |
| 2012/0259540 | A1* | 10/2012 | Kishore ................. G06Q 10/06 701/410 |
| 2012/0323992 | A1 | 12/2012 | Brobst et al. |

OTHER PUBLICATIONS

Stephan Mantler et al., "GEARViewer: A State of the Art Real-Time Geospatial Visualization Framework," Proceedings of Real Corp, 2011: pp. 345-354.

Christopher Torpelund-Bruin et al., "Geospatial Web Data Tessellation and Visualization," Advances on Information Sciences and Service Sciences, Mar. 2011, vol. 3(2): pp. 87-93.

Victor Teixeira De Almeida et al., "Indexing the Trajectories of Moving Objects in Networks," GeoInformatica, 2005, vol. 9(1): pp. 33-60.

\* cited by examiner

GEOSPATIAL VISUALIZATION PERFORMANCE IMPROVEMENT FOR CONTIGUOUS POLYLINES WITH SIMILAR DYNAMIC CHARACTERISTICS

This application is a continuation of co-pending U.S. patent application Ser. No. 13/164,504, filed Jun. 20, 2011. The aforementioned related patent application is herein incorporated by reference in its entirety.

BACKGROUND

Embodiments of the invention are generally directed to approaches for rendering map data supplied by a network server. More specifically, embodiments of the invention provide an efficient approach for rendering contiguous polylines with similar dynamic characteristics rendered as part of a geospatial visualization.

A geographic information system (GIS) generally refers to computer systems and software used to capture, store, manipulate, analyze, manage, and display a variety of geographic information and related data. Typically, a GIS system allows users to view geographic or geospatial data rendered as a map. A GIS system may also use the geographic (and other) data to create a variety of reports, charts, or other visualizations presented along with the map data. For example, a common use of a GIS system is to provide users with a visualization of a map—such as a roadmap. In addition to the geographical map data, a GIS system can provide additional features or visual elements rendered on (or with) a map data. For example, a GIS system could provide driving directions between two locations along with a path representing a route between two such locations rendered along with the map data. Further, the GIS system can integrate other information, e.g., to provide driving directions that take into account (or simply convey) current traffic conditions or public transportation directions that factor in current delays. Doing so may require the GIS system to interact with some other data source, e.g., real-time public transportation schedules or current traffic, to respond to a client request for map data. In addition to these "road-map" type applications, a GIS system may be used for a variety of other applications including, e.g., archaeology, geography, cartography, land surveying, public utility management, natural resource management, urban planning, emergency management, network management, supply chain management, fleet management, etc.

A GIS system may represent map data using vector graphics elements (i.e., using a collection of geometric primitives such as points, lines, curves and polygons). For example, a roadway rendered as a single, contiguous line may actually be represented as a large collection of individual road segments. To create an image, a client renders the map data by processing each such segment, even though the individual segments may be indistinguishable in the rendered visualization. Thus, in some cases, visualizing GIS data can require large amounts of map data to be processed. And in cases where the visualization includes dynamic aspects, the amount of data processed by the client increases accordingly.

SUMMARY

Embodiments provide techniques for rendering maps, which are particularly useful for maps that include dynamic information (e.g., a map which visualize traffic congestion on roadways). One embodiment of the invention provides a computer implemented method of responding to a request for map data. This method may generally include receiving a request for map data to render a visualization of a map and determining static map data responsive to the request. The static map data includes a set of static map elements to be rendered at specified locations in the visualization of the map. This method also includes determining dynamic map data responsive to the request. The dynamic map data includes information characterizing a dynamic state for a plurality of dynamic map elements to be rendered at specified locations in the visualization of the map. This method also includes combining adjacent dynamic map elements which share a common dynamic state into combined dynamic map elements and outputting the static map elements and the dynamic map elements for rendering.

Additional embodiments include a computer-readable storage medium storing an application, which, when executed on a processor, performs the above recited method as well as a system having a processor and a memory storing an GIS application configured to respond to request for map data, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide an efficient approach for rendering geographic information system (GIS) data. For example, traffic management software may be configured to provide visualizations, in near real time, of current road conditions for a requested area. Metadata describing the road segments stored in a database may include both static and dynamic details. Static details include, e.g., a name and description, location coordinates defining line segments used to represent the road on a map (referred to as a polyline), any embedded traffic control devices present in the segment, etc. Dynamic details include, e.g., details about a road segment such as current traffic speeds, congestion conditions, accidents/events, etc. The traffic management software may use the static and dynamic map data to represent current traffic conditions. For example, roadway segments (i.e., polylines) on the map may be rendered in red, yellow, or green to indicate the current speed/congestion situation on a particular road segment. As the road conditions change, updates are provided to the client so that the road condition visualization (i.e., the color of polyline segments) can be updated to reflect the changes. Of course, for other GIS systems, the particular static and dynamic map data will differ.

As noted above, visualizing GIS data such as this can require large amounts of map data to be processed by the client. For example, the time required to render road segment polylines on a map is generally proportional to the number of segments to be rendered. In cases where the map is zoomed out to display a wide area of roadway infrastructure, the number of individual polyline segments can number in the tens of thousands (or more) and the time to render them may become unacceptably high. Some on-line mapping services address this issue by reducing the amount of detail or amount of dynamic information displayed as the user zooms out a view of the map. For example, as a user zooms out, fewer roadways are colored to show traffic conditions. This approach is undesirable for certain professional situations. For example, color coding a visualization of roads based on current traffic speeds allows traffic operators to more easily identify potential problems within a roadway infrastructure. If some road segments are excluded while they are viewing an area for which they are responsible, they may miss situations the system is intended to highlight for them.

Embodiments of the invention address this (and other) situations for rendering large amounts of GIS data. In one embodiment, a server component responding to a request for GIS data for a given area combines contiguous polylines which share the same dynamic characteristics. For example, a map server may combine the polylines of contiguous road segments sharing the same current speed/congestion conditions. Two contiguous road segments will frequently share the same current condition and thus have the same color coding on a rendered map. In that situation, the two polylines representing the contiguous road segments are combined into a single polyline for rendering the dynamic map data. This process can be repeated for all contiguous road segments sharing the same dynamic conditions (and thus color coding). Doing so may greatly reduce the number of individual polylines that are sent to a client for rendering. Even though a longer polyline may take longer to render than a shorter one, a single, long polyline typically renders much faster than two individual polylines representing the same shape. Thus, the smaller set of combined of polylines representing the roadways may result in significantly faster overall rendering of the GIS data than can be obtained by rendering a large set of individual polylines.

Further, this approach can be generalized to allow a traffic operator to configure and define rules that they want to apply to the display of dynamic map details, e.g., color code representing road congestion conditions, only displaying the segments with high congestion level. etc., and also allows the traffic operator specifying which dynamic map details will be displayed at the high zoom out levels. Further still, the same approach for combining polyline map data determined share common dynamic characteristics may be applied to a variety of other GIS systems.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a GIS server may be deployed to a computing cloud (whether the cloud itself is provided by the enterprise or a third party).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention described below rely on a particular example of a GIS system using a client-server architecture to provide GIS information to a client. Specifically, an example where traffic (and related) dynamic information is used to augment a visualization of a road map. However, it should be understood that the techniques described herein may be adapted to a variety of GIS systems used to create visualization for a variety of static and dynamic data. Accordingly, references to the specific embodiment are included to be illustrative and not limiting.

Figure 1:
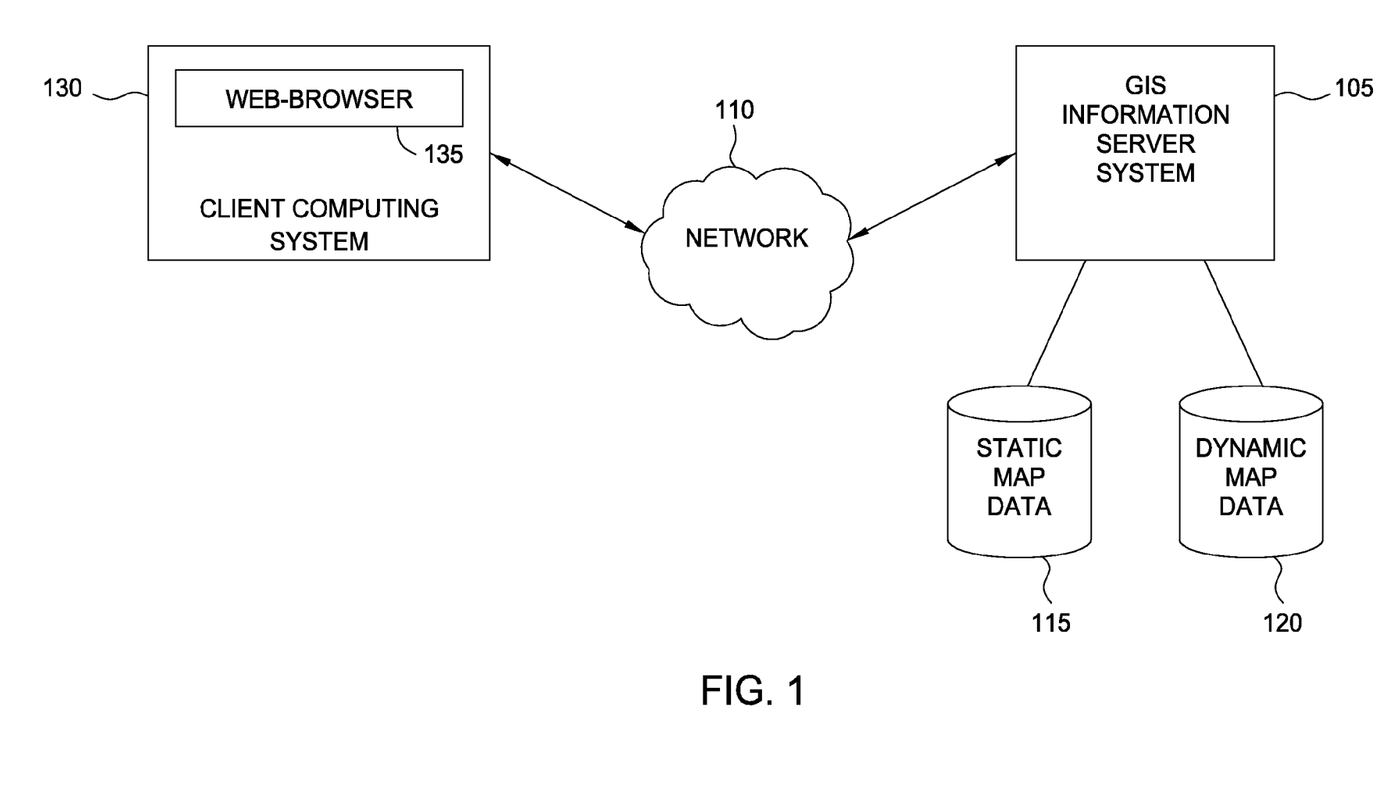
FIG. 1 illustrates an example computing infrastructure used to provide GIS data to a variety of client systems, according to one embodiment of the invention.

FIG. 1 illustrates an example computing infrastructure 100 used to provide GIS data to a variety of client systems, according to one embodiment of the invention. As shown, the computing infrastructure 100 includes a GIS server 105 and a client computing client system 130, each connected to a communications network 110.

Illustratively, the client system 130 includes a web browser 135 used to communicate with the GIS server 105 over the network 120 to request (and update) map data (i.e., elements of static map data 115 and dynamic map data 120) to render on a display. In one embodiment, the browser 135 may be configured to request map data for a specified area. For example, a user could request a map by specifying a street address, street name, intersection, landmark, business name or using other geographic references. In response, the GIS server 105 could retrieve a set of static map data to return to the client 130 in response to the request. For example, the static map data 115 could provide image tiles of pre-rendered map images or satellite images at different zoom levels. In such a case, the GIS server 105 would determine a set of tiles needed to respond to a user's request and return them for rendering on the client. If the user later changed a zoom level, a different set of tiles for the same general map area would be retrieved from static map data 115 and returned to the user.

In addition to returning elements of static map data 115, the GIS server 105 also returns elements of dynamic map data 120. Again using the example of a roadmap, the dynamic map data 120 could represent traffic conditions along the roadways visible in map to be rendered. In such a case, the GIS server 105 would determine what segments of road are present in the elements of static map data 115 being returned for a given request and determine the current dynamic traffic or congestion conditions for each segment of roadway in the map to be rendered. Further, the GIS server 105 may represent segments of roadway as a collection of polylines. Each segment of polyline corresponds to a segment of roadway having a then-current dynamic state, e.g., a given level of traffic congestion or average traffic speed at that section of road. Other examples of dynamic map data 120 could include weather information, road construction information, the presence (and current functioning state) of traffic control devices (e.g., a semaphore, or bars at a train crossing), etc.

In one embodiment, prior to returning elements of static map data 115 and dynamic map data 120 to the client, the GIS server 105 combines polyline segments of roadway to be rendered based on the elements of dynamic map data 120 sharing a common dynamic state. For example, assume roadway segments (i.e., polylines) on the map may be rendered in red, yellow or green to indicate the current speed/congestion situation on a particular road segment. In such a case, adjacent polyline segments sharing the same speed/congestion state would be combined into a larger polyline. Of course, for GIS systems presenting other types of geospatial data, the static data 115 and dynamic data 120 would be different. For example, consider a GIS server 105 configured to monitor the location, on-time performance, and passenger loads for a commuter public transportation network (trains, subways, and buses). In such a case, the elements of static map data 115 could represent a portion of a rail network or bus line a user wished to view and the elements of dynamic map elements 120 could represent the current location of a train along with a count of passengers in each train car, where more crowded cars are rendered in a different color than less crowded cars. In such a case, the GIS server 105 could combine train cars sharing a similar passenger load (and which are therefore rendered using the same color) to a single vector graphics element for rendering. More generally, the GIS server 105 may combine elements of map data to be rendered on the client based on each combined element sharing a common dynamic state, and therefore rendered appearance, on the client device.

In turn, once the relevant elements of static map data 115 and dynamic map data 120 are returned to the client system 130, the browser 135 processes the data to render a visualization of the requested map on a display. For example, the browser 135 may include a HTML5 engine, JavaScript engine (or other scripting engine) configured to iterate over a set vector graphics data representing the map to be rendered and dynamically generate a map.

The map data sent to the client for rendering may be formatted using a variety of formats. For example, map data may be formatted using open standards such as GeoJSON or Keyhole Markup Language (KML). As is known, GeoJSON provides GeoJSON is a format for encoding a variety of geographic data structures. Features in GeoJSON contain a geometry object and additional properties, and a feature collection represents a list of features. Similarly, KML is an XML notation for expressing geographic annotation and visualization within Internet-based, two-dimensional maps and three-dimensional Earth browsers. Of course, other formats understood by the client computing system 135 could be used as well.

Figure 2:
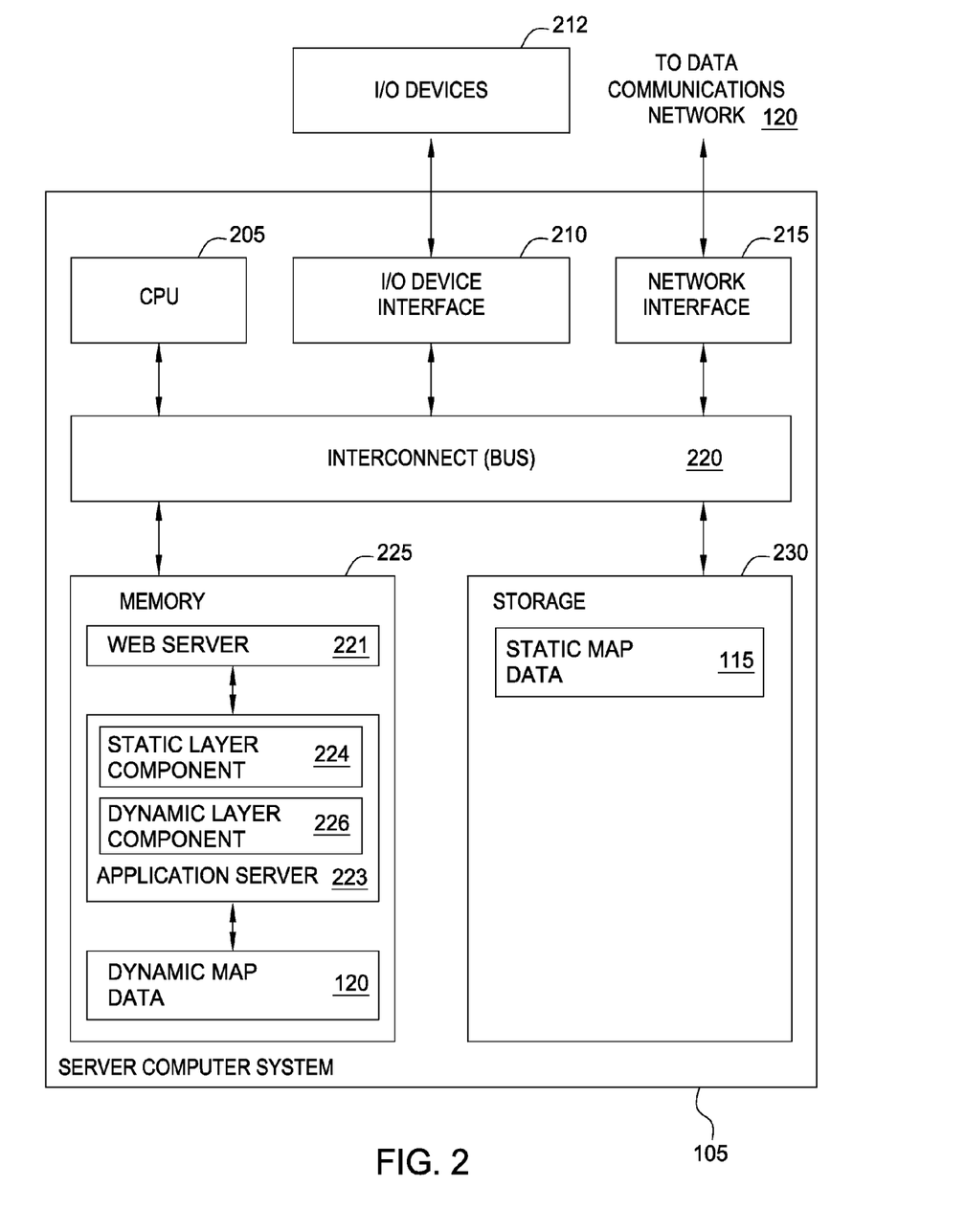
FIG. 2 illustrates an example the GIS server used to send map data to requesting clients, according to one embodiment of the invention.

FIG. 2 illustrates an example of the GIS server 105 configured to send map data to requesting clients, according to one embodiment of the invention. As shown, the GIS server 105 includes, without limitation, a central processing unit (CPU) 205, a network interface 215, an interconnect 220, a memory 225 and storage 230. The GIS server 105 may also include an I/O device interface 210 connecting I/O devices 212 (e.g., keyboard, display and mouse devices) to the GIS server 105.

The CPU 205 retrieves and executes programming instructions stored in the memory 225. Similarly, the CPU 205 stores and retrieves application data residing in the memory 225. The interconnect 220 facilitates transmission, such as of programming instructions and application data, between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN).

As shown, the memory 225 includes an HTTP server 221, an application server 223, and the dynamic map data 120. And the storage 230 includes static map data 115. HTTP server 221 provides a software application configured to respond to web page requests received from client computing systems (e.g., client systems 130 of FIG. 1). The HTTP server 221 may pass such a request to the application server 223, which generates content for the HTTP server 221 to return to the client system 130. For example, in the present context, a user may access a web page which allows the user to compose a map search query, i.e., to specify the parameters for a map. In response, the application server 223 generates elements of static map data 115 and dynamic map data 120 to return in response to the request.

Illustratively, the application server includes a static map layer component 224 and a dynamic map layer component 226. In one embodiment, the map returned to the client may include a number of layers, composited to create a visualization of the requested map. The static map layer component 224 generates (or retrieves) static map data elements to format and return to the web server 221 (and ultimately, to the client 130). For example, as noted above, map data may be represented at different zoom levels using a set of tiles. In such a case, the static layer component 224 may determine which map tiles need to be returned to a client, and if needed encode the tiles in the appropriate format for a client (e.g., .png, .bmp, or other image format) as well as obtain (or generate) the static map features (e.g., roadway locations) encoded using formats such as GeoJSON or KML.

Similarly, the dynamic layer component 226 generates (or retrieves) dynamic map data elements to return to the web server 221 (and ultimately, to the client 130). As noted, the dynamic map data elements 120 may represent a then existing state for some elements depicted in the static map data, such as traffic congestion or current average vehicle speed along a section of roadway. In one embodiment, the GIS server 105 is configured to receive and store the dynamic map data 120 in the memory 225 of the GIS server 105, making it available to respond to requests from clients. Alternatively, the dynamic layer component 226 may make the appropriate calls to other computing systems, database servers, web services, etc., to obtain the dynamic map data 120 needed to respond to a particular request. For example, the GIS server could request real-time traffic conditions by sending a web services requests to computing systems maintained by a public department of transportation.

The dynamic layer component 226 may encode (or receive) the dynamic map data 120 in encoding formats such as GeoJSON or KML. Once encoded, the dynamic layer component 226 may also combine some elements of dynamic map data 120 to improve the rendering performance on the client system 130. As noted, one example includes combining contiguous polyline segments representing the then-present traffic speed or condition for adjacent sections of road to be rendered on a roadmap. After obtaining the static map data 115 and dynamic map data 120 responsive to a request, and after combining elements of map data as appropriate, the application server 223 returns this information to the web server 221, which returns it to the client computing system 130.

Figure 3:
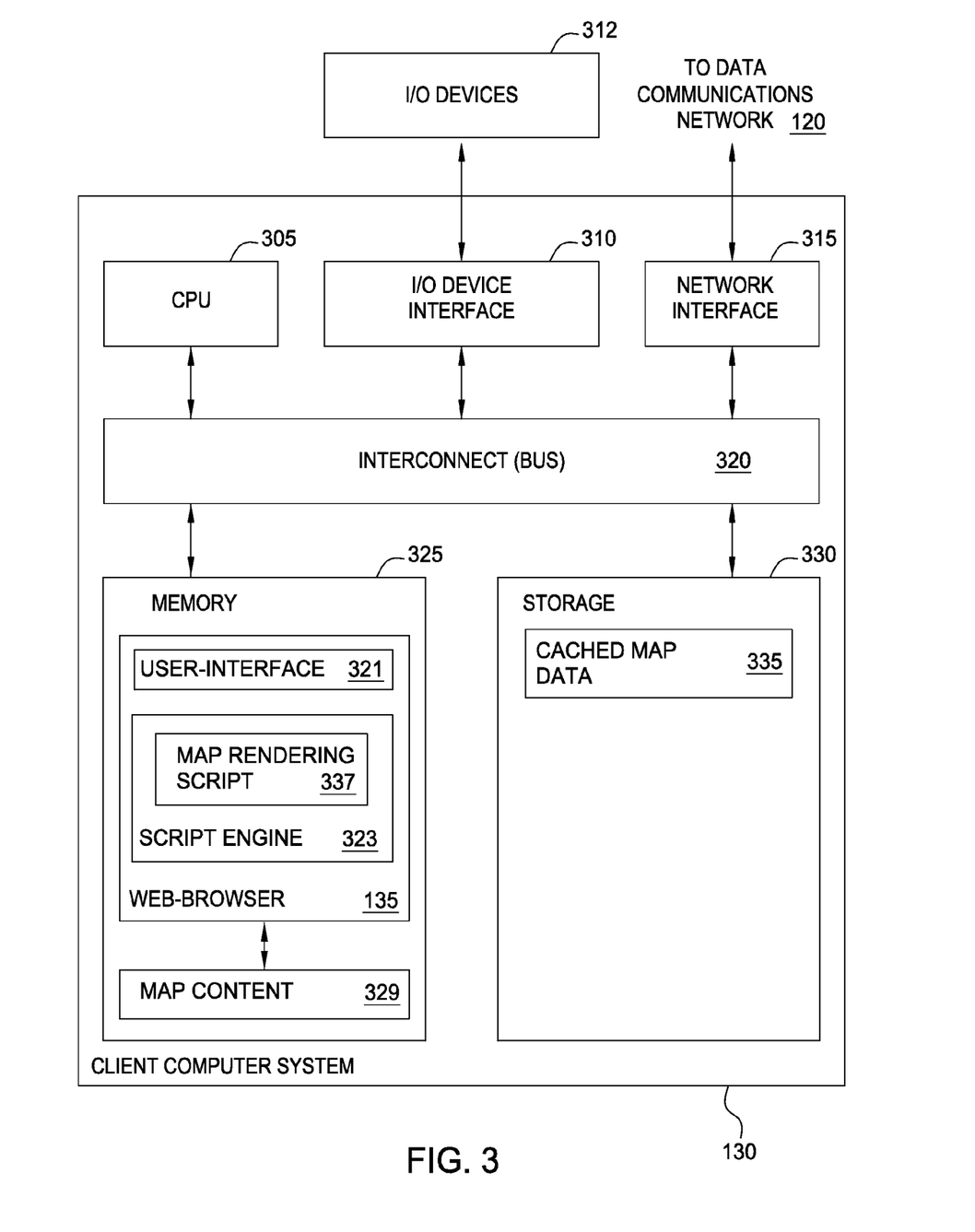
FIG. 3 illustrates an example of a client computing system used to render visualizations of GIS data, according to one embodiment of the invention.

FIG. 3 illustrates an example of a client computing system 130 used to render visualizations of GIS data, according to one embodiment of the invention. As shown, the client computing system 130 includes, without limitation, a central processing unit (CPU) 305, a network interface 315, an interconnect 320, a memory 325 and storage 330. The computing system 130$_1$ may also include an I/O devices interface 310 connecting I/O devices 312 (e.g., keyboard, display and mouse devices) to the computing system 130$_1$.

Like CPU 205, CPU 305 is included to be representative of a single CPU, multiple CPUs, a single CPU having multiple processing cores, etc., and the memory 325 is generally included to be representative of a random access memory. The interconnect 320 is used to transmit programming instructions and application data between the CPU 305, I/O devices interface 310, storage 330, network interface 315 and memory 325. The network interface 315 is configured to transmit data via the communications network 120, e.g., to request and receive map data. Storage 330, such as a hard disk drive or solid state (SSD) storage drive, may store non-volatile data.

Illustratively, the memory 325 includes map data 329 and a web browser 135, which itself includes a user interface 321 and a script engine 323. Storage 330 stores cached map data content 335. As is known, the web browser 135 provides a software application which allows a user to access web pages and other content hosted by a server. In context of the present disclosure, the user interface 321 corresponds to components of the web browser 135 used to request map data with dynamic components from a GIS information server. Accordingly, a user may interact with interface 231 to specify properties for a map to obtain from the GIS information server, which is then stored in memory 325 as map data 329 (or written to storage 330 as cached map data 355). Once a request for a map is made, and a response is received, the web browser may pass the map content 329 to a map rendering script 323 for processing.

In one embodiment, the script engine 323 is configured execute the map rendering script 337 to generate an image from the map content 329. As noted, e.g., the map content 329 may include a collection of tiles (presenting static map data) and GeoJSON objects describing dynamic aspects of the GIS information used to augment the visualization of the static map data. Continuing with the traffic congestion example, each GeoJSON object could provide a segment of a polyline to be rendered using a color corresponding to the then existing traffic congestion or average vehicle speed present at the location of roadway encoded in the GeoJSON object. Further, prior to being received by the client, the GIS server may have combined multiple segments of polyline representing sections of roadway sharing a common dynamic state. Doing so reduces the number of individual elements (e.g., GeoJSON objects) that need to be processed by the map rendering script 323. Further, the GIS server may periodically update the web browser 135 with updated dynamic map data. In such a case, the map rendering script 337 may update the rendered visualization of the map data displayed to the user.

Further, for some embodiments, the user interface 321 may allow the user to request additional information regarding an element of map data presented in the rendering. For example, assume a user clicks on a segment of roadway to see whether any further information is available for a segment of road experiencing traffic congestion. In such a case, as the clicked segment may be part of a combined polyline, the web browser 135 may make a call to the GIS information server, passing the longitude and latitude of the point on the line where the user clicked. In response, the GIS server may determine details for the segment closest to the point clicked by the user, and identify whether any further information is available regarding that segment, e.g., a report of a traffic accident.

Note, while FIG. 3 illustrates a web-browser running on a computing system, such as a desktop or laptop computer, embodiments of the invention may be adapted for use with other computing devices. For example, web-browser applications are available for mobile telephone devices, tablet computers, game consoles, netbooks, etc. Further, in addition to using the computing platform of a web-browser and script engine, dedicated software applications may be developed to access the GIS server. For example, a mobile phone application—commonly referred to as an "app"—could be developed to access the GIS information system and render static and dynamic map data on a mobile telephone using the techniques disclosed herein. Such an "app" could be configured, e.g., to determine a user's location and retrieve the static and dynamic map data needed to visualize traffic conditions for that general area. Of course, a variety of other approaches could be used to allow a client device to access static and dynamic map data from a GIS server.

Figure 4:
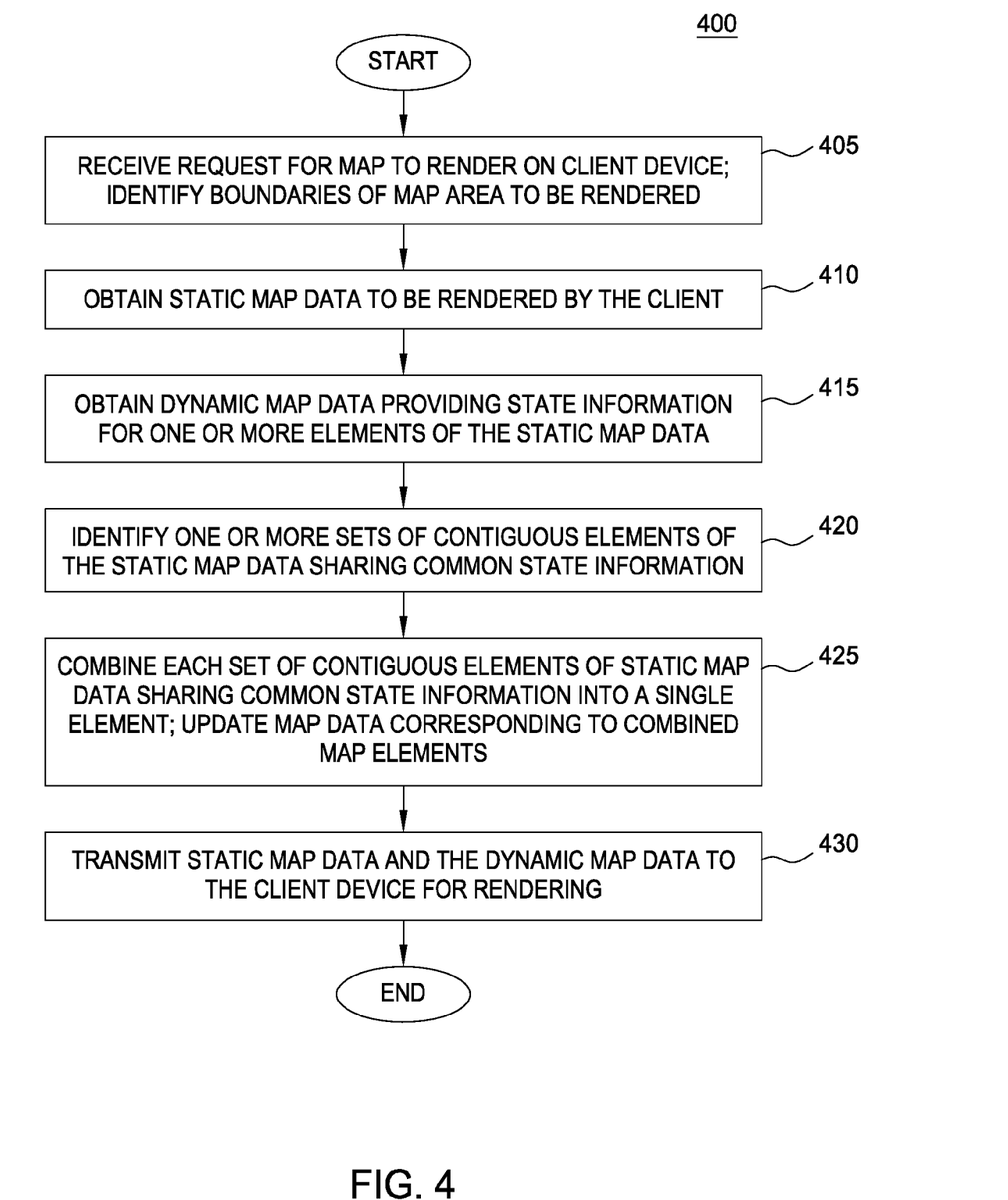
FIG. 4 illustrates a method for providing GIS data to a requesting client, according to one embodiment of the invention.

FIG. 4 illustrates a method 400 for providing GIS data to a requesting client, according to one embodiment of the invention. As shown, the method 400 begins at step 405, where a GIS server receives a request for a map to render on a client device. The GIS server may determine the boundaries for a map to render on the client. For example, the request may specify a location and a zoom level for the requested map. In response, at step 410, the GIS server obtains (or generates) a collection of static map data elements for rendering on the client. As noted, the static map data may provide a roadmap for the selected area. Further, each segment of road may be represented as a polyline encoded as a distinct GeoJSON or KML objects. At step 415, the GIS server obtains dynamic map data providing state information for one or more elements of the static map data.

At step 420, the GIS may identify one or more elements of the static map data which share a common dynamic state. For example, the GIS server may identify contiguous polylines corresponding to segments of roadway which share a common traffic congestion or average vehicle speed, such that when rendered, the contiguous polylines are rendered to have a common appearance, i.e., as a single line rendered using the same color. Once identified, at step 425, the GIS server may combine each set of contiguous elements of map data sharing common state information into a single element. For example, a set of contiguous polylines elements may be combined into a single element. Resulting in a single GeoJSON or KML object, replacing multiple such objects. At step 430, the GIS server transmits the static map data and the dynamic map data to the client device for rendering.

Figure 5:
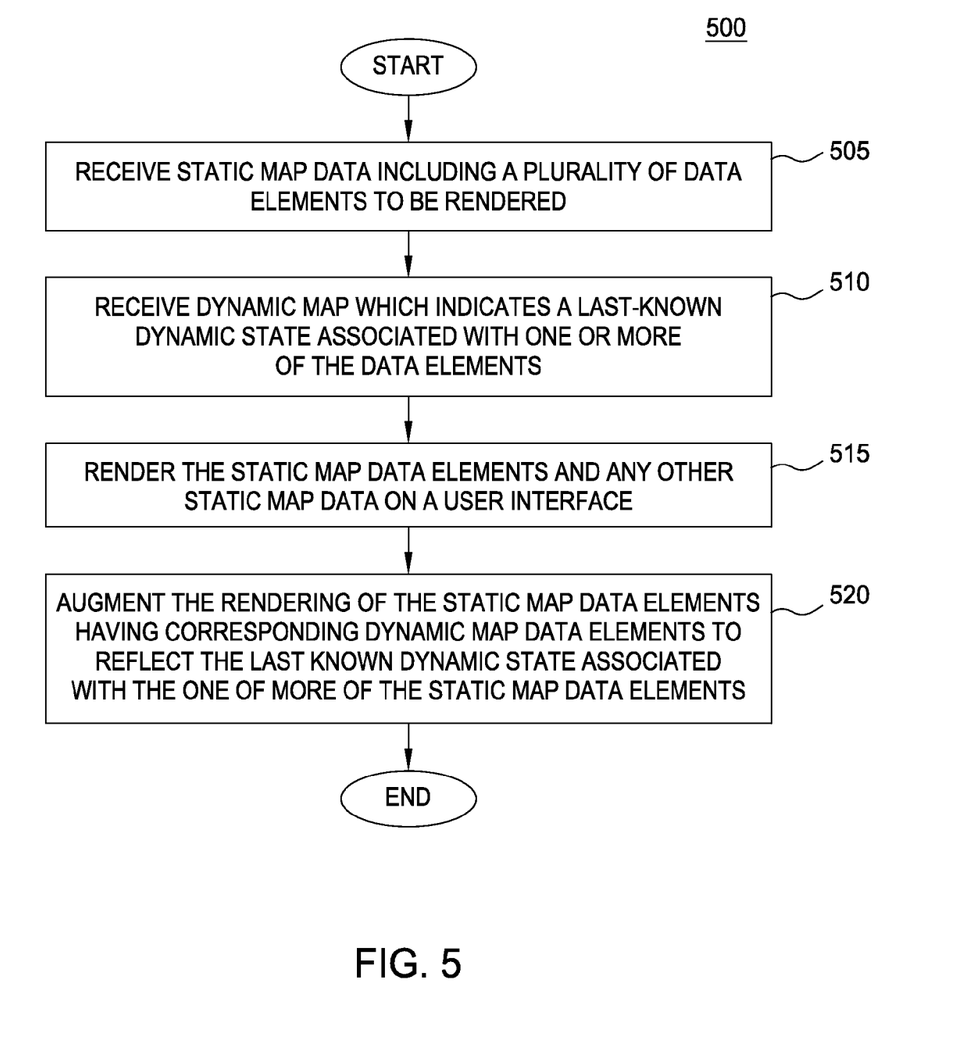
FIG. 5 illustrates a method for a client to render GIS data, according to one embodiment of the invention.

FIG. 5 illustrates a method 500 for a client to render GIS data, according to one embodiment of the invention. As shown, the method 500 begins at step 505, where a client device receives a collection of static map data including a plurality of data elements to be rendered. And at step 510, the client device receives a collection of dynamic data which indicates a dynamic state associated with one or more of the data elements in the map to be rendered. At step 515, the client device renders the static map data elements and any other static map data supplied by the GIS server on a user interface. For example, a web browser may execute a map rendering script to process each of static map elements supplied by the GIS server. And at step 520, the client device may render dynamic map elements. For example, in one embodiment, the visualization of the map is rendered as a composite of a plurality of layers. In such a case, the static map data is rendered on one layer (either as a set of tile images or by rendering vector graphic objects and the dynamic map data is rendered as another layer.

For example, a user may interact with a web browser to specify parameters for a requested map, and in response, receive a map rendering script along with a collection of encoded map elements to be rendered (e.g., a collection of GeoJSON or KML objects). The static map data elements could include data providing a roadmap for a requested area in a city, and the dynamic data elements could provide the last known traffic conditions for some sections of roadway. As noted above, segments of roadway sharing a common dynamic state may have been combined into a single data element to be rendered by the client prior to being transmitted to the client device.

Figure 6:
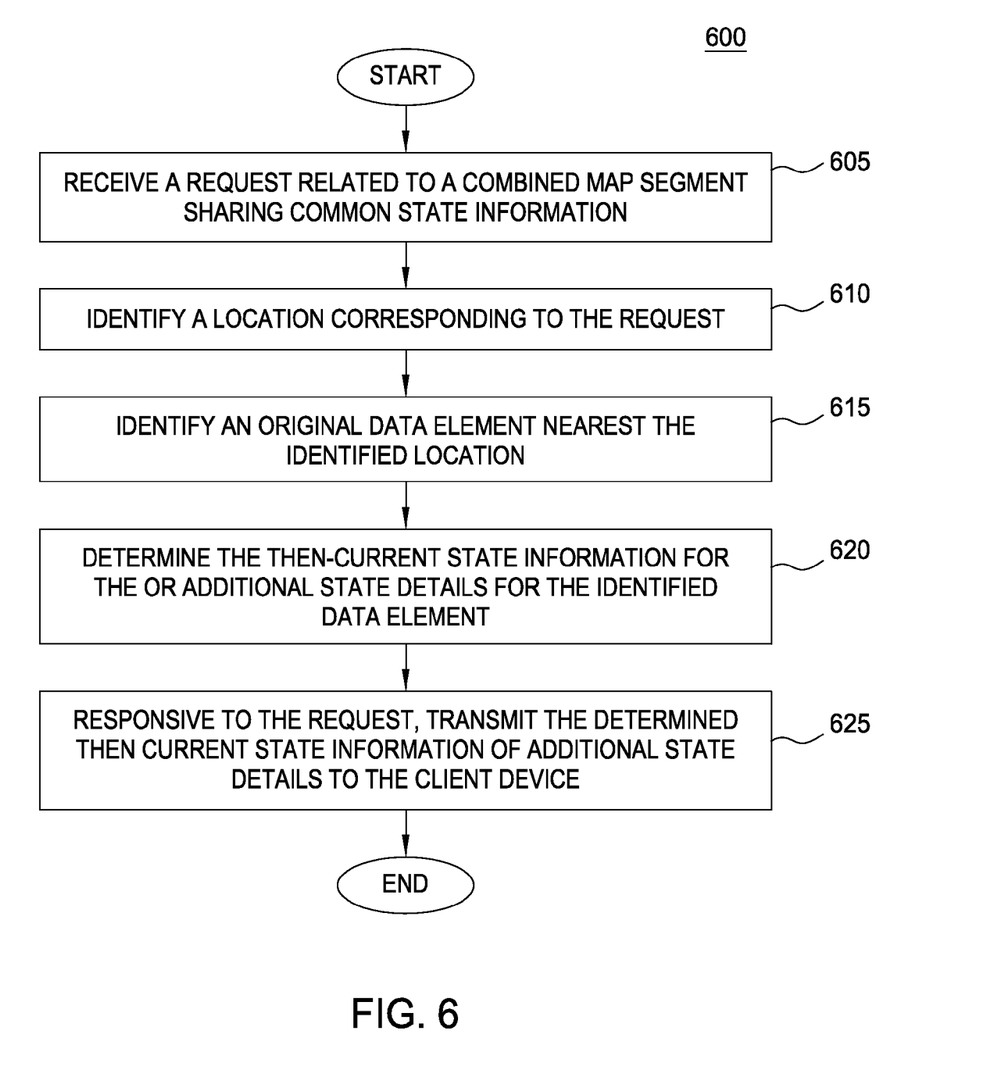
FIG. 6 illustrates a method for a client to request additional detail information regarding dynamic information in a rendered visualization of GIS data, according to one embodiment of the invention.

FIG. 6 illustrates a method 600 for a server to provide additional detail information regarding dynamic information in a rendered visualization of GIS data, according to one embodiment of the invention. As shown, the method 600 begins at step 605, where a GIS server receives a request related to a map rendered on a client device, rendered in-part, using map elements combined due to sharing a common dynamic state. In one embodiment, the client device responds to a user request for additional detail regarding a specific region in the map by transmitting to the GIS server an indication of geospatial coordinates on the map, e.g., latitude and longitude coordinates corresponding to a point on the map clicked by a user.

At step 610, the GIS server identifies a location in the map corresponding to the request. And at step 615, the GIS server identifies an original map data element to the identified location. For example, the GIS server may identify a road segment with dynamic map data closest to the clicked location. Once identified, at step 620, the GIS server determines the then-current state information or additional state details related to the identified data element. Continuing with the example of a roadmap presenting near real time traffic conditions, the GIS server may identify when the dynamic information was last updated or identify any additional metadata regarding traffic congestion such as reports of an accident or reports of a traffic light malfunction. Of course, depending on the type of GIS data, the content of the additional details or metadata regarding the dynamic state of an element in map may vary. At step 625, any additional state information or details related to the state information identified at step 620 is transmitted to the client device.

Figure 7:
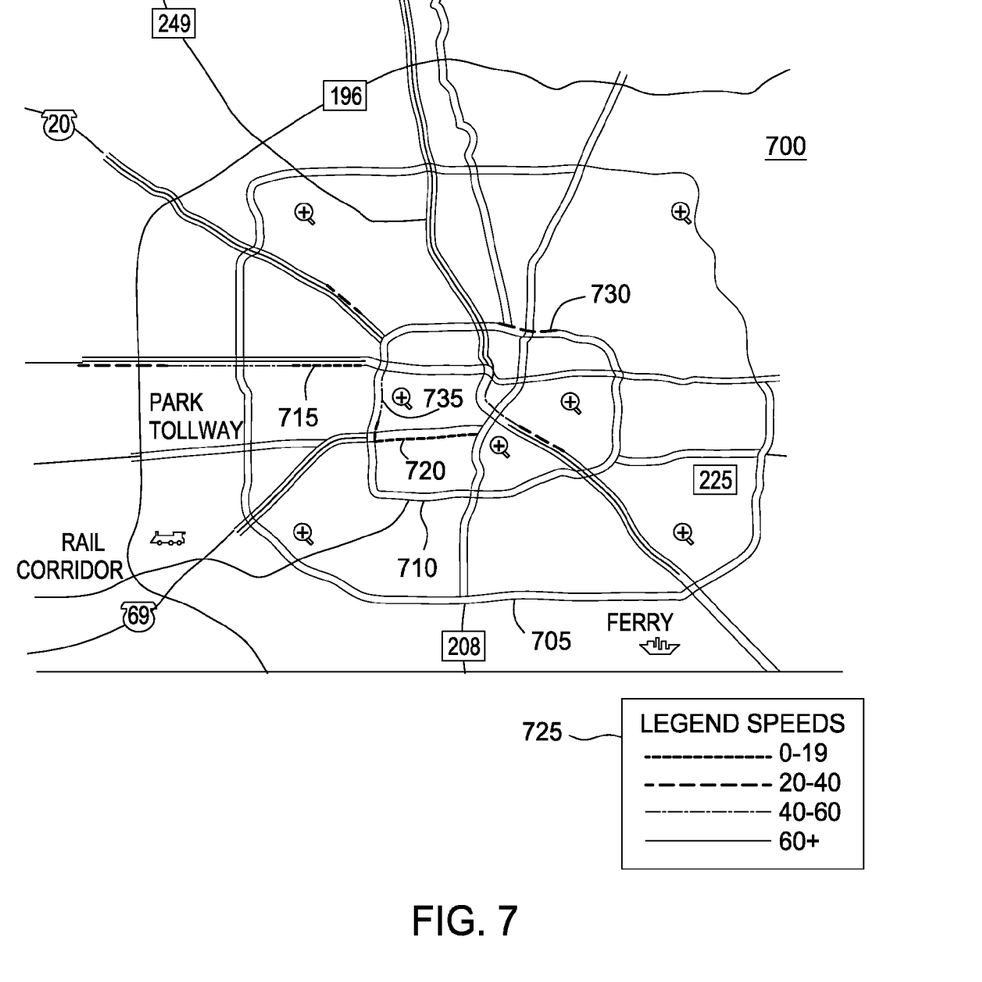
FIG. 7 illustrate an example user interface showing a rendered visualization of GIS data, according to one embodiment of the invention.

FIG. 7 illustrate an example user interface showing a rendered visualization 700 of GIS data, according to one embodiment of the invention. As shown, the rendered visualization 700 includes a roadmap of a citywide freeway system which includes an inner loop 710, and an outer loop 705. Such a freeway system may have speed sensors to observe vehicle speeds placed at short distances (e.g., every tenth of a mile). In turn, this leads to dynamic map data for each tenth of a mile stretch of the freeway system.

In this example, the freeway system is rendered using different colors (represented here using the line patterns as shown in legend 725) to indicate the then existing traffic conditions. However, rather than transmit map data, such as a set of GeoJSON objects, providing a colored polyline to render for each tenth of a mile segment, the server combines contiguous segments of roadway rendered using the same color. For example, much of the inner loop 710 has traffic speeds that will result in the roadmap being rendered using the same color. As a result, hundreds, if not thousands, of dynamic map data elements can be combined into a single map data element, such as a single GeoJSON polyline segment. Map data for other contiguous sections of the inner loop 710 may be combined into polyline segments as well. Dynamic data for sections 730 and 735 may be combined, as can several other sections of roadway, e.g., outer loop 705, and sections 715 and 720.

Advantageously, combining dynamic data for segments, without changing the visual appearance of the resulting rendering, allows the client to efficiently render large amounts of dynamic data in visualization 700. As adjacent segments often share the same dynamic state, particularly in the case of roadway traffic congestion, combining dynamic amp data in this manner greatly reduces the number of individual polylines that are sent to a client for rendering. Even though a longer polyline may take longer to render than a shorter one, a single, long polyline typically renders much faster than two individual polylines representing the same shape. Thus, the smaller set of combined of polylines representing the roadways may result in significantly faster overall rendering of the GIS data than can be obtained by rendering a large set of individual polylines.

While the foregoing is directed to embodiments of the present invention, other and further embodiments of the invention may be devised without departing from the basic scope thereof, and the scope thereof is determined by the claims that follow.

What is claimed is:

1. A computer-implemented method of responding to a request for map data, comprising:
   determining a current dynamic state for a plurality of dynamic map elements to be rendered on a static map image;
   identifying one or more sets of adjacent dynamic map elements, from the plurality of dynamic map elements, sharing a common dynamic state;
   combining each identified set of adjacent dynamic map elements into a combined dynamic map element; and
   sending the combined dynamic map elements to a client for rendering on the static map image.

2. The method of claim 1, wherein each of the plurality of dynamic map elements comprises a polyline.

3. The method of claim 2, wherein each polyline is rendered using a color determined based on the common dynamic state.

4. The method of claim 1, further comprising, sending the client any of the plurality of dynamic map elements not sent to the client as part of one of the combined dynamic map elements.

5. The method of claim 1, wherein the current dynamic state is traffic congestion information.

6. The method of claim 1, further comprising:
determining an updated dynamic state for one or more of the plurality of dynamic map elements; and
sending the updated dynamic state to the client for rendering.

7. The method of claim 1, further comprising:
receiving, from the client, a request including location coordinates related to a first one of the combined dynamic map elements;
identifying a first one of the adjacent dynamic elements combined as part of the first one of the combined dynamic map elements; and
sending detail information related to the current dynamic state of the first one of the adjacent dynamic map elements to the client.

8. The method of claim 1, wherein the dynamic map elements are formatted as GeoJSON objects.

9. A non-transitory computer readable storage medium storing one or more application programs, which, when executed on a processor, performs an operation for responding to a request for map data, the operation comprising:
determining a current dynamic state for a plurality of dynamic map elements to be rendered on a static map image;
identifying one or more sets of adjacent dynamic map elements, from the plurality of dynamic map elements, sharing a common dynamic state;
combining each identified set of adjacent dynamic map elements into a combined dynamic map element; and
sending the combined dynamic map elements to a client for rendering on the static map image.

10. The non-transitory computer readable storage medium of claim 9, wherein each of the plurality of dynamic map elements comprises a polyline.

11. The non-transitory computer readable storage medium of claim 10, wherein each polyline is rendered using a color determined based on the common dynamic state.

12. The non-transitory computer readable storage medium of claim 9, wherein the operation further comprises, sending the client any of the plurality of dynamic map elements not sent to the client as part of one of the combined dynamic map elements.

13. The non-transitory computer readable storage medium of claim 9, wherein the current dynamic state is traffic congestion information.

14. The non-transitory computer readable storage medium of claim 9, wherein the operation further comprises:
determining an updated dynamic state for one or more of the plurality of dynamic map elements; and
sending the updated dynamic state to the client for rendering.

15. The non-transitory computer readable storage medium of claim 9, wherein the operation further comprises:
receiving, from the client, a request including location coordinates related to a first one of the combined dynamic map elements;
identifying a first one of the adjacent dynamic elements combined as part of the first one of the combined dynamic map elements; and
sending detail information related to the current dynamic state of the first one of the adjacent dynamic map elements to the client.

16. The non-transitory computer readable storage medium of claim 9, wherein the dynamic map elements are formatted as GeoJSON objects.

17. A system, comprising:
a processor; and
a memory storing one or more application programs, which when executed on the processor, performs an operation for responding to a request for map data, the operation comprising:
determining a current dynamic state for a plurality of dynamic map elements to be rendered on a static map image,
identifying one or more sets of adjacent dynamic map elements, from the plurality of dynamic map elements, sharing a common dynamic state,
combining each identified set of adjacent dynamic map elements into a combined dynamic map element, and
sending the combined dynamic map elements to a client for rendering on the static map image.

18. The system of claim 17, wherein each of the plurality of dynamic map elements comprises a polyline.

19. The system of claim 18, wherein each polyline is rendered using a color determined based on the common dynamic state.

20. The system of claim 17, wherein the operation further comprises, sending the client any of the plurality of dynamic map elements not sent to the client as part of one of the combined dynamic map elements.

21. The system of claim 17, wherein the current dynamic state is traffic congestion information.

22. The system of claim 17, wherein the operation further comprises:
determining an updated dynamic state for one or more of the plurality of dynamic map elements; and
sending the updated dynamic state to the client for rendering.

23. The system of claim 17, wherein the operation further comprises:
receiving, from the client, a request including location coordinates related to a first one of the combined dynamic map elements;
identifying a first one of the adjacent dynamic elements combined as part of the first one of the combined dynamic map elements; and
sending detail information related to the current dynamic state of the first one of the adjacent dynamic map elements to the client.

24. The system of claim 17, wherein the dynamic map elements are formatted as GeoJSON objects.

* * * * *